UNITED STATES PATENT OFFICE.

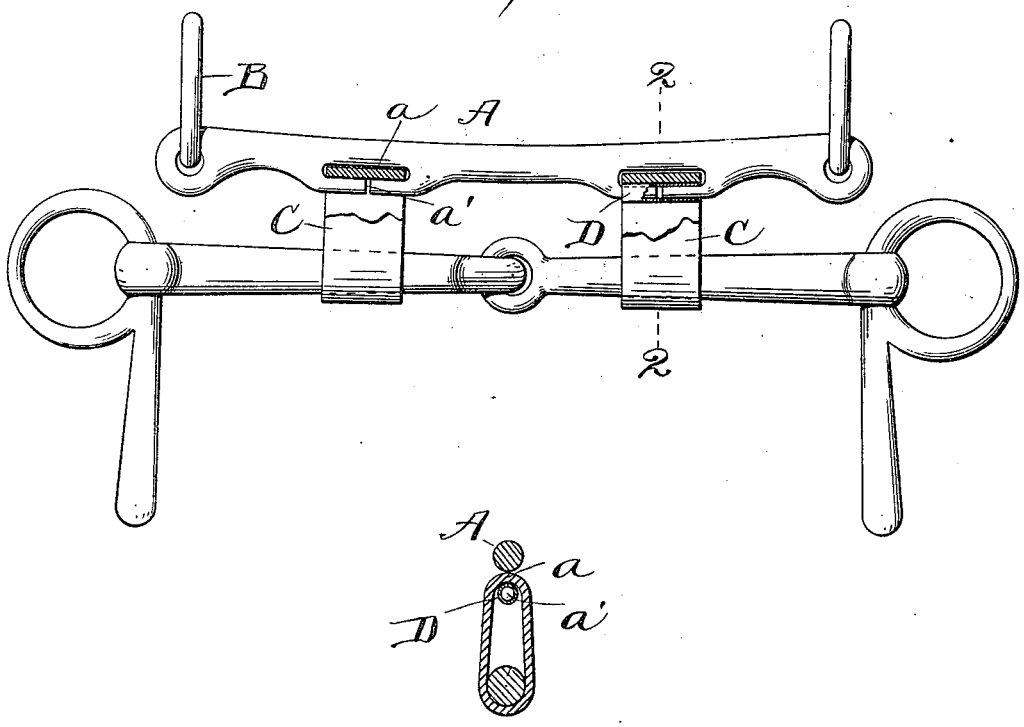

LIBERTY K. RAYMOND, OF GARRETTSVILLE, OHIO, ASSIGNOR, BY MESNE ASSIGNMENTS, TO THE GILLIAM MANUFACTURING COMPANY, OF CANTON, OHIO.

DEVICE FOR ATTACHING OVERCHECK-BITS TO DRIVING-BITS.

SPECIFICATION forming part of Letters Patent No. 670,248, dated March 19, 1901.

Application filed November 28, 1900. Serial No. 37,962. (No model.)

*To all whom it may concern:*

Be it known that I, LIBERTY K. RAYMOND, a citizen of the United States, residing at Garrettsville, in the county of Portage and State of Ohio, have invented a certain new and useful Improvement in Devices for Attaching the Overcheck-Bit to the Driving-Bit, of which the following is a full, clear, and exact description, reference being had to the accompanying drawings.

The invention relates to a checkrein-bit and the means whereby it may be operatively connected with any ordinary driving-bit.

The invention consists in a checkrein-bit having the feature of construction hereinafter described and in the combination therewith of endless flexible loops whereby to attach the driving-bit, as definitely set forth in the claims.

In the drawings, Figure 1 is a plan view of my improved checkrein-bit, the driving-bit, and the means for connecting them; and Fig. 2 is a cross-section thereof.

The checkrein-bit A is of a suitable size and shape and has at its ends the rings B B for attaching the checkreins. In the edge of the bit-bar are a plurality of (two only are shown) long narrow eyes *a*, through which the endless flexible loops C are threaded. The outer walls of these eyes are slotted, as shown, the slot *a'* being only wide enough to permit the convenient insertion of said loops. In fact, they are so narrow that the rubber bands must be stretched, and thereby reduced in thickness, in order to be passed through them. These loops are preferably made of vulcanized elastic rubber, and the driving-bit is to be passed through these, as shown in the drawings. At the right side of Fig. 1 the slotted wall of the eye is shown in the embrace of a metal sleeve D, made of very thin malleable brass, which is wrapped around said wall after the rubber band has been inserted. Its function is to close said slots and prevent the accidental removal of said bands.

The advantage of the construction is primarily due to the fact that endless loops of rubber may be used and may be easily threaded through the eyes when the bits are made, or when the loops in the eyes become worn, or when longer or shorter loops are desired.

Having described my invention, I claim—

1. A checkrein-bit having elongated eyes near the edge thereof, the outer walls of each said eyes having a slit, combined with endless loops passing through said eyes and adapted to be slipped through said slits, and a driving-bit passing through said loops, substantially as specified.

2. A checkrein-bit having elongated substantially rectangular eyes near its edge, said eyes having slits through their outer walls, combined with flat endless rubber loops passing through said eyes and adapted to be slipped into said eyes through said slits, and a line-bit passing through said loops, substantially as specified.

3. The combination of a checkrein-bit having near one edge a plurality of eyes having their outer walls slitted, endless flexible loops threaded through said eyes, and thin metal sleeves wrapped around the slitted walls of said eyes and closing the slits therein, and a driving-bit passing through said flexible loops, substantially as specified.

In testimony whereof I hereunto affix my signature in the presence of two witnesses.

LIBERTY K. RAYMOND.

Witnesses:
 ROSCOE J. WEBB,
 C. A. CRANE.